United States Patent

[11] 3,579,838

[72] Inventor Waldemar A. Ayres
    Rutherford, N.J.
[21] Appl. No. 719,214
[22] Filed Apr. 5, 1968
[45] Patented May 25, 1971
[73] Assignee Becton, Dickinson and Company
    Rutherford, N.J.
    Continuation-in-part of application Ser. No. 612,692, Jan. 30, 1967, now abandoned.

[54] METHOD OF THERMOMETER POINTING AND APPARATUS THEREFOR
10 Claims, 12 Drawing Figs.

[52] U.S. Cl. ..................................................... 33/19
[51] Int. Cl. ..................................................... B43l 13/24
[50] Field of Search ......................................... 33/18, 19;
    73/1; 250/218, 222

[56] References Cited
UNITED STATES PATENTS
| | | | |
|---|---|---|---|
| 3,382,761 | 5/1968 | Dyson | 33/19(A) |
| 2,931,735 | 4/1960 | Richards | 73/1(F) |

FOREIGN PATENTS
| | | | |
|---|---|---|---|
| 1,142,447 | 1/1963 | Germany | 33/19(A) |

Primary Examiner—Harry N. Haroian
Attorney—Kane, Dalsimer, Kane, Sullivan and Kurucz ABSTRACT: A thermometer-pointing apparatus which automatically performs the required facing operation and horizontal scanning to sense and accurately locate the top of a mercury column for purposes of pointing. For such purposes a photoelectric control system is connected with electromechanical means for manipulating the thermometer automatically as the top of the mercury column is being located and an improved optical system is provided for projecting a magnified image of the mercury column onto the photoelectric control system which is responsive thereto, thereby facilitating the pointing of the thermometer.

PATENTED MAY 25 1971

INVENTOR
WALDEMAR A. AYRES

BY
Kane, Dalsimer Kane, Sullivan and Smith
ATTORNEYS

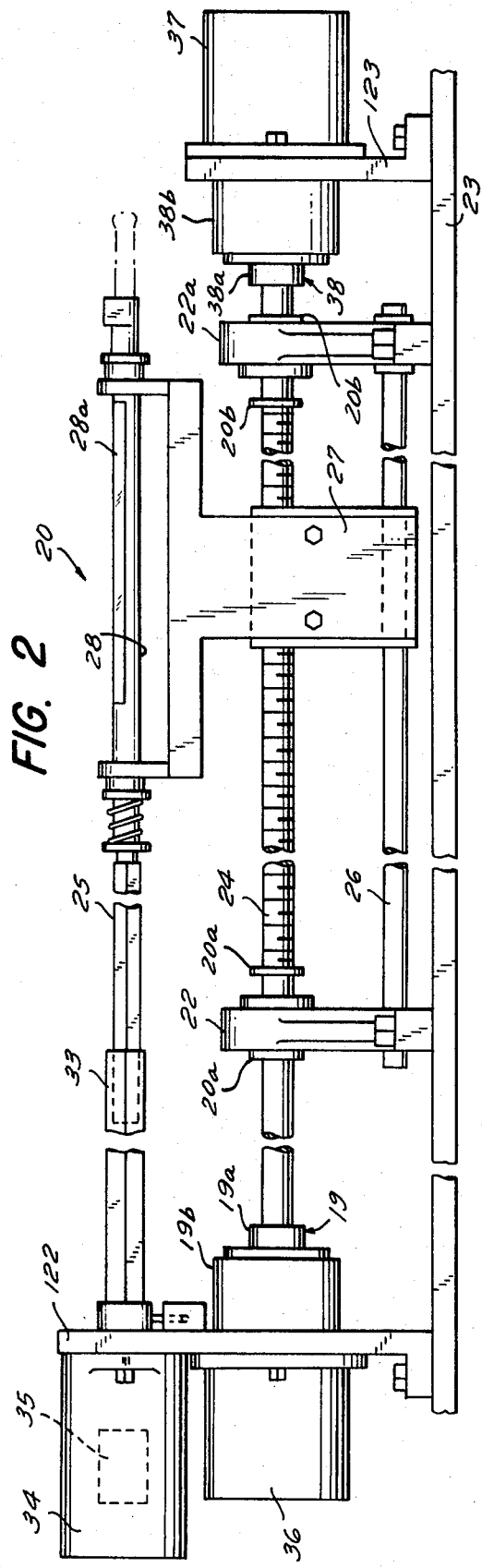
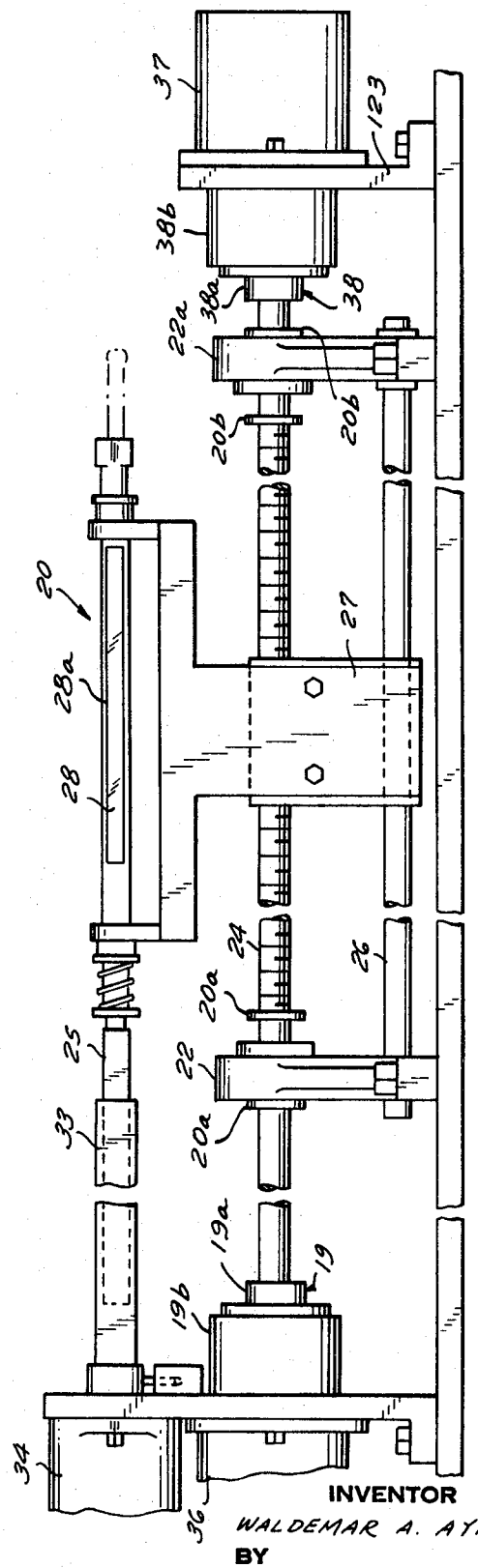

PATENTED MAY 25 1971

INVENTOR
WALDEMAR A. AYRES
BY
Kane, Dalsimer, Kane, Sullivan & Smith
ATTORNEYS

METHOD OF THERMOMETER POINTING AND APPARATUS THEREFOR

CROSS REFERENCE TO RELATED APPLICATIONS

This application is a continuation-in-part of my previously filed pending application Ser. No. 612,692 filed on Jan. 30, 1967 now abandoned.

BACKGROUND OF THE INVENTION

In the present art of thermometer pointing, the facing, locating and marking of the top of a mercury column is ordinarily done by hand while employing an optical system to project a magnified image of the mercury column onto a screen for the benefit of the operator. However, these prior optical systems are highly inefficient and the majority of the reflected light from the mercury column is lost. The operator is usually required to locate the thermometer in the path of the light reflected from a glass plate held at a 45° angle. He then rotates the thermometer by hand, which is called facing, until the mercury column reflects the greatest amount of light rays. The reflected image of the mercury column passes back through the 45° glass plate and is projected and magnified by a lens. The magnified image is reflected by a 45° front surface mirror onto a screen. The operator then marks on the thermometer the point he believes to be the top of the mercury column according to what is seen on the screen. Naturally, the human element involved results in occasional error. A mechanical and automatic means for performing the facing and locating steps would be more desirable and accurate, and reduce costs.

In addition, the inefficient optical system used to transmit the image of the mercury column onto the screen leaves much to be desired. For maximum optical contrast, a bright image of the mercury column is desirable. Naturally, a system is desirable which will utilize the greatest percentage of the light emanating from the thermometer thereby helping to project the brightest image throughout the system. A sharp image is also very important. A system which requires the least amount of space is also advantageous in that the total operating space of the pointing apparatus can be held to a smaller area. A system would be desirable which would efficiently, quickly and accurately face and locate the top of a mercury column within a thermometer. A system of this type should include an optical system which will more effectively utilize the light reflected by the mercury column within a thermometer to enable the reflected image to be used for accurately controlling automatic apparatus.

SUMMARY OF THE INVENTION

An apparatus for pointing a thermometer is provided which includes a supporting structure, a rotatable lead screw and rotatable shaft which are horizontally mounted on the supporting structure in a spaced vertical relationship. A carriage is mounted on the shaft and the lead screw so that when the lead screw is rotated, the carriage will be horizontally translated. The carriage has means to mount a thermometer so that the thermometer is longitudinally aligned with the rotatable shaft and when the shaft is rotated the thermometer will be simultaneously rotated. Facing means is mounted on the supporting structure and is connected so that it may be actuated to automatically engage and rotate the rotatable shaft. Translating means is also mounted on the supporting structure and connected so that it may be actuated to automatically rotate the lead screw, thereby causing the carriage and consequently the thermometer to be horizontally translated. A light source is provided with its rays directed on the thermometer so that the rays are reflected by the fluid column within. A right-angle prism is placed between the light source and the thermometer so that the rays from the source pass directly through the prism and the reflected rays from the thermometer will be deflected at a right angle by the prism. A lens may be placed adjacent the prism so that the deflected rays will pass therethrough and form a magnified image. At least one photoelectric cell having an aperture is provided in alignment with the prism to receive the deflected and focused rays. Power means are connected to the photocells which may be phototransistors and amplifiers, to the facing means and the translating means to automatically stop the facing means when an image of the fluid column of predetermined brightness is being received by the phototransistors and to automatically stop the translating means when the top of the fluid column is reached and there is no longer a bright reflected image being received by the photocells. A fast scanning speed is followed by a slow speed for accurate stopping. The thermometer is thereby stopped in a predetermined position so that the location of the top of the fluid column within may be marked thereon. An automatic marking means is connected to the power means and is positioned so that when it is actuated by the power means it will automatically mark the point on the thermometer which designates the top of the fluid column within the thermometer.

It is, therefore, an object of this invention to provide a thermometer-pointing apparatus which alleviates the above-mentioned problems and accomplishes the above-mentioned advantages.

Another object of this invention is to provide a thermometer-pointing apparatus having an optical system with means to provide an improved reflected image which is brighter and sharper than the images previously obtainable. An optical system is provided which is substantially more efficient in its use of light. Extremely little of the illuminating light is lost and substantially all of the light reflected from the thermometer is directed to the lens to form the desired image.

A further object of this invention is to provide a thermometer-pointing apparatus which will automatically, efficiently and accurately face a thermometer, locate the top of the mercury column within the thermometer, and mark the point on the thermometer of the top of the mercury column. An accuracy as high as approximately plus or minus two one-thousandths of an inch has been obtained, which is a significant improvement over the approximate plus or minus 10 one-thousandths accuracy of known methods.

Still a further object of this invention is to provide a thermometer-pointing apparatus which has means to keep the thermometer fixed in one position without play, thereby adding to the accuracy of the apparatus in locating the top of the mercury column.

With these and other objects in mind, reference is had to the attached drawings embodying the invention.

BRIEF DESCRIPTION OF THE DRAWINGS

FIG. 2 is a side elevation view of the electromechanical portion of the thermometer-pointing apparatus taken along the plane of line 2–2 of FIG. 1 and having a thermometer mounted therein;

FIG. 3 is another view of FIG. 2 with the thermometer having been translated along its axis;

DESCRIPTION OF THE PREFERRED EMBODIMENT

Figure 1:
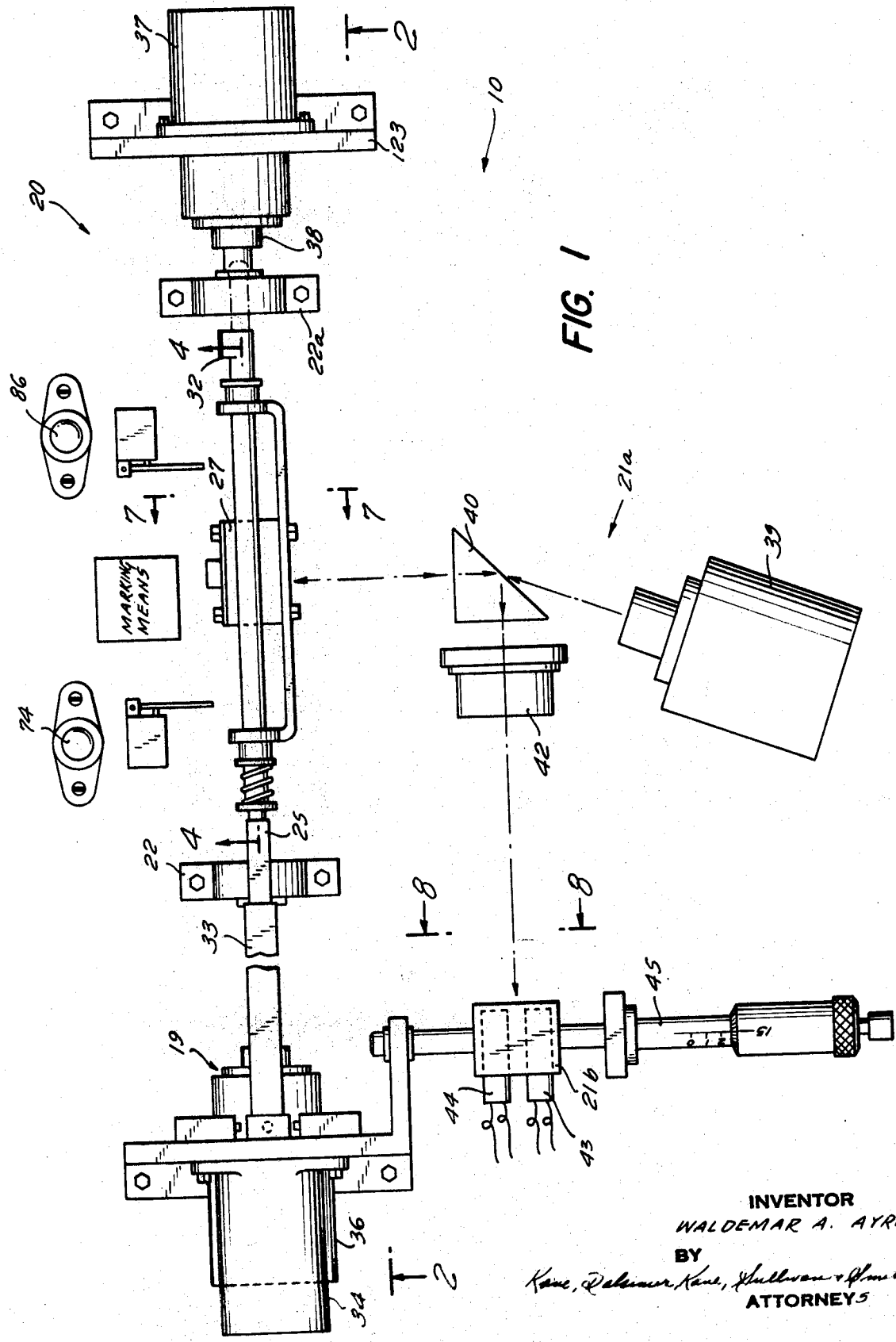
FIG. 1 is a top view of a thermometer-pointing apparatus which embodies this invention with arrows showing the direction of travel of the light rays.

The thermometer-pointing apparatus 10 in FIG. 1 is provided with two interrelated and interconnected groups of parts, namely, an electromechanical group 20 of parts cooperating to mount, rotate and translate a thermometer, and an optical and photoelectric group 21a and 21b FIGS. (1 and 10) of parts which cooperate in controlling the operation of the electromechanical parts.

Figure 6:
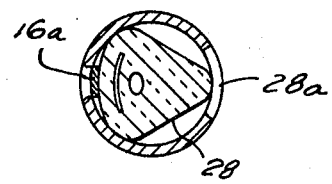
FIG. 6 is a sectional end view of a thermometer being held in position taken along the plane of line 6–6 of FIG. 4.
Figure 7:
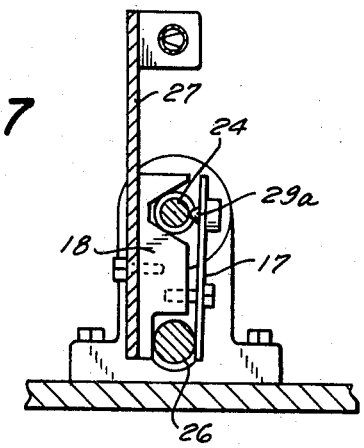
FIG. 7 is a sectional end view of the thermometer mounting and carriage portion taken along the plane of line 7–7 of FIG. 1.
Figure 8:
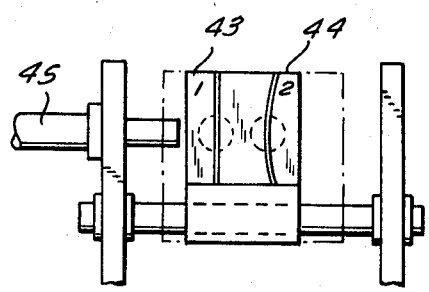
FIG. 8 is a side elevation view of the photocells taken along the plane of line 8–8 of FIG. 1.

The electromechanical combination 20 is best depicted in FIGS. 2 and 3 wherein supporting brackets 22 and 22a are securely fastened to a support 23. A rotatable-threaded lead screw 24 is journaled in supporting brackets 22 and 22a. Vertically housed above and below lead screw 24 respectively are a rotatable facing shaft 24 and a guide shaft 26. A carriage 27 is mounted on shafts 24 and 26 so that when the lead screw 24 is rotated, the carriage will be translated in a horizontal direction. Guide shaft 26 helps to maintain the carriage in the correct position and guide it during translation. A thread follower 29a (FIG. 7) is mounted on the carriage so that it will follow the thread of lead screw 24 as it is rotated thereby translating carriage 27. To help maintain thread follower 29a in positive relationship with lead screw 24, an antibacklash nut assembly 18, as depicted in FIG. 7, is bolted to carriage 27. Assembly 18 contains a leaf spring 17 which is biased against thread follower 29a to keep it in tight relationship with lead screw 24 thereby preventing any slipping of thread follower 29a due to uneven threads on lead screw 24 or other causes. A thermometer 28 (FIGS. 2 and 3) is adapted to be mounted in the upper portion of carriage 27 and positioned in tubular portion 32a (FIG. 4) so that its longitudinal axis is aligned with the longitudinal axis of facing shaft 25. An opening 28a (FIG. 6) is provided in the longitudinal surface of tubular portion 32a to permit the light source to impinge on thermometer 28.

Figure 4:
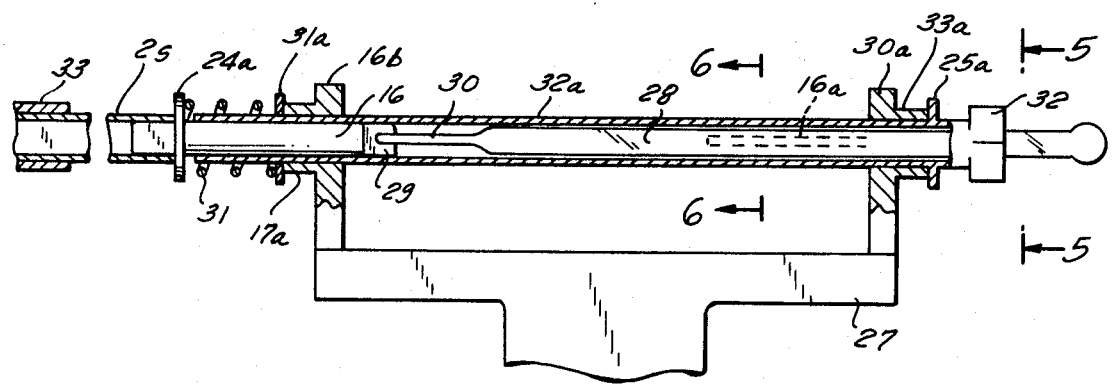
FIG. 4 is a sectional elevation view of the thermometer mounting portion thereof taken along the plane of line 4–4 of FIG. 1.
Figure 5:
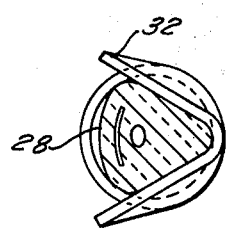
FIG. 5 is a sectional end view of a thermometer being held in position, taken along the plane of line 5–5 of FIG. 4.

It is important that the thermometer be mounted in a manner which will keep it in a fixed position with no play. This is important in that when the thermometer is translated to locate the top of the mercury column therein, the thermometer must be stopped at as close as possible to the precise point desired. This permits the thermometer to engagement pointed in a very accurate manner. FIG. 4 depicts a structure which may be used to help in accomplishing this result. A beveled edge 29 is provided on the end of bar 16 which holds bulb 30 of thermometer 28 in place so that no play will occur at that end. The other end of bar 16 is housed within shaft 25 and will rotate as shaft 25 is rotated. Bar 16 will in turn rotate the portion of the thermometer-mounting means which will cause the thermometer 28 to rotate. A spring 31 is provided to additionally help maintain a tight engagement between parts. Thermometer 28 is also held in position by means of clip 32 and is depicted in FIGS. 4, 5 and 6. Beveled edge 29 of bar 16 and a spring 16a on the interior surface of tubular portion 32a biases the thermometer against the opposing wall of portion 32a.

The portion of bar 16, near its beveled end is housed within tubular portion 32a of the the thermometer-mounting means. This tubular portion 32a is rotatably journaled within extension 17a of arm 16b of the thermometer-mounting means. A floating ring 31a is positioned on tubular portion 32a, adjacent but not connected to extension 17a. A retaining ring 24a is secured to shaft 25 and to bar 16. Spring 31 presses against retaining ring 24a and at its other end against floating ring 31a, so that floating ring 31a is pressed against extension 17a.

Near its other end, tubular portion 32a is rotatably journaled within extension 33a of arm 30a of the thermometer-mounting means. A retaining ring 25a is fixedly mounted on tubular portion 32a, adjacent to extension 33a. Retaining ring 25a will rotate with respect to arm 30a with no play therebetween as tubular portion 32a rotates. All end play is automatically taken up by the expansion of compression spring 31.

When the thermometer is translated and the top of the mercury column is located, the translation must be precisely stopped as previously disclosed. Retaining ring 25a bears against extension 33a and prevents tubular portion 32a and the enclosed thermometers 28 from moving any further in the direction of translation. Thermometer 28 has a bulb end bearing against beveled end 29 of bar 16 and that together with the pressure of spring 16a prevents the thermometer from moving with respect to tube 32a. As previously mentioned, carriage 27 is restrained from moving any further by the pressure of the backlash nut assembly 18 which holds thread follower 29a in the stop position on lead screw 24.

In regard to lead screw 24, it is mounted in brackets 22 and 22a (FIGS. 1, 2 and 3) in a manner to prevent it from having any longitudinal play. Brackets 22 and 22a are rigidly bolted to base 23 and a pair of clips 20a and 20b on each side of each bracket are mounted on lead screw 24 to prevent its longitudinal movement with respect to the brackets. When the brackets are bolted to the base they are secured so that they bear against the clips 20a and 20b which are furthest from carriage 27. This serves to prevent any longitudinal play in the lead screw.

Therefore, when the carriage is translated and the top of the mercury column is sensed, the above-mentioned four features of the apparatus will assist in accurately stopping the translation at the precise point. The particular way the brackets are bolted restrains the lead screw, the backlash nut assembly restrains the carriage, the retaining ring 25a restrains the tub 32a and the bar 16 and spring 16a restrains the thermometer. The result is extremely accurate pointing of the top of the mercury column.

Facing shaft 25, which may be manufactured of square tubing, is slidably housed at one end within the square telescoping metal tubing or housing 33. The sliding fit between shaft 25 and housing 33 is tight enough so that when housing 33 is rotated, shaft 25, by means of their square shapes, will also be rotated, and when carriage 27 is translated by lead screw 24 connected shaft 25 will be slidably displaced within housing 33 by pressure from retaining ring 24a. The other end of shaft 25 is mounted on bar 16 as discussed in order to transmit the rotational motion to thermometer 28.

A reversible facing gear motor 34 (FIG. 2) is mounted on supporting structure 122 and is positioned so that it will rotate housing 33 and facing shaft 25. A clutch and brake 35 is associated with facing motor 34 so that starting and stopping of facing shaft 25 may be controlled. A common commercial type of reversible synchronous motor having a speed of 6 r.p.m. and having an electrically operated clutch and a spring-operated brake built in, such as one manufactured by the Furst Company in Princeton, Ind., has been found to be adequate for this facing operation. Naturally, when facing shaft 25 is rotated, interconnected thermometer 28 will be also rotated thereby facing the thermometer until it is in the most advantageous position.

A reversible high-speed drive motor 36 is mounted on supporting structure 122 and is positioned vertically below reversible facing motor 34. It is connected with lead screw 24 so as to rotate lead screw 24 and consequently translate carriage 27 at high speed. A clutch 19, having a rotor portion 19a and a stator portion 19b, is also associated with motor 36 so that starting and stopping of the translating carriage and thermometer may be controlled. Additionally, a stepping motor 37 also having a clutch 38, with a rotor portion 38a and a stator portion 38b, is mounted on supporting structure 123 and is connected to the other end of lead screw 24. Stepping motor 37 also serves to rotate lead screw 24 and translate carriage 27. High speed drive motor 36 and stepping motor 37 may be electrically interconnected by control means so that high-speed drive motor 36 and stepping motor 37 can be started and stopped successively to translate thermometer 28 from a high speed to a low speed to an eventual stop. A representative control means to accomplish this will be described later. Any standard type of reversible high-speed drive motor may be employed and also, a standard common type of stepping motor, such as the type manufactured commercially by The Superior Electric Co., Bristol, Connecticut may be utilized. Any standard clutch mechanism may be used with motor 36 and motor 37, such as the ones manufactured commercially by the Warner Electric Brake and Clutch Company. FIG. 2 shows the position of thermometer 28 and carriage 27 before translation has begun and FIG. 3 shows a representative position of thermometer 28 and carriage 27 after translation has stopped.

Figure 10:
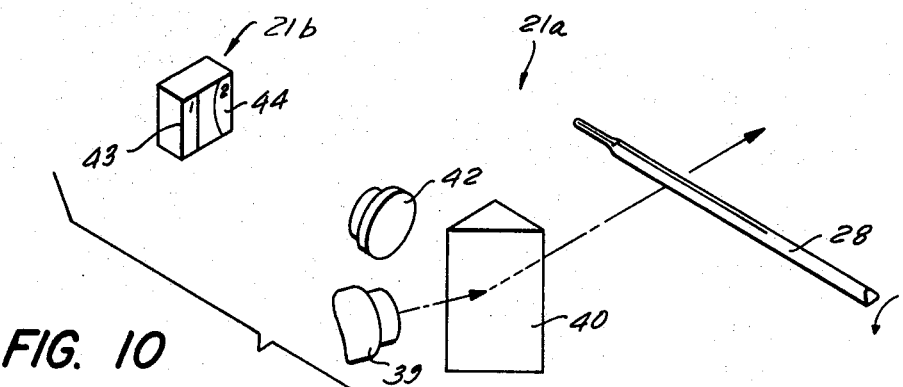
FIG. 10 is a perspective view of the optical system portion of the thermometer-pointing apparatus with an arrow showing the direction of rotation of the thermometer and an arrow showing the path of travel of the light rays from the light source.
Figure 11:
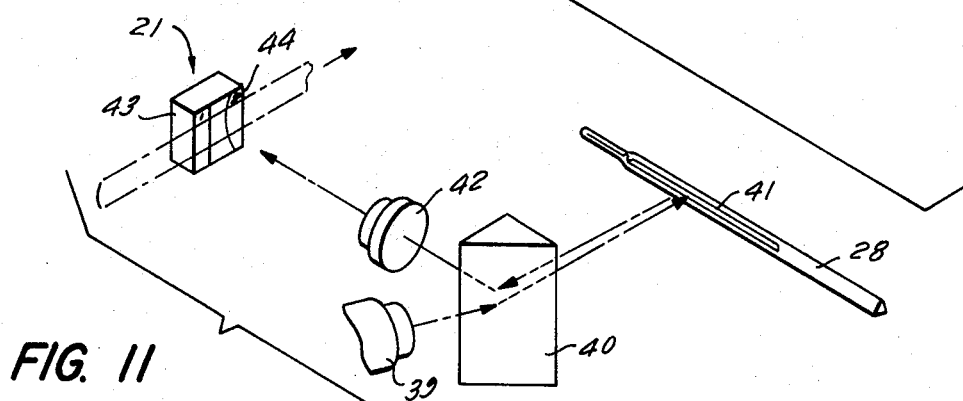
FIG. 11 is another view of the apparatus in FIG. 10 showing the thermometer being translated and arrows showing the direction of travel of the light rays from the light source and the direction of travel of the reflected image of the mercury column until it reaches the photocells.
Figure 12:
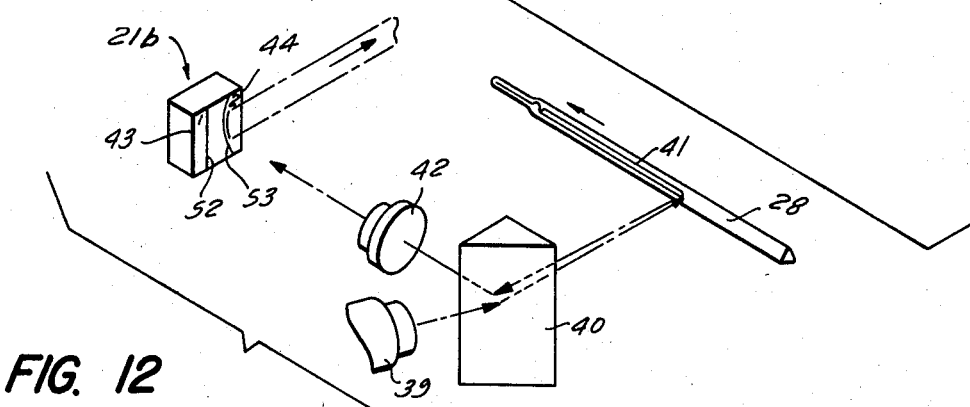
FIG. 12 is another view of FIG. 11 showing the position of the thermometer and the reflected image of the mercury column after the top of the mercury column has been reached and translation has been automatically stopped.

FIGS. 10—12 depict the parts required for the photoelectric control portion 21a and 21b of thermometer-pointing apparatus 10 and the path of light which will successfully operate the system. A light source 39 is positioned so that its light rays will pass through the back of right-angle prism 40. A light projector such as Model 707 manufactured by Bell & Howell Company, Chicago, Ill., will operate satisfactorily as will many similar light sources. The rays will continue and illuminate rotating thermometer 28 as seen in FIG. 10. In FIG. 11, light is depicted being reflected from mercury column 41 in thermometer 28 so that it contacts right-angle prism 40 and is deflected as right angles into enlarger lens 42. The image is then focused (and may be enlarged, for example to approximately eleven thirty-seconds of an inch width) by lens 42 and is projected on a pair of photocells 43 and 44). A micrometer 45 (FIG. 1) is provided to accurately position photocells 43 and 44 FIGS. 10, 11 and 12) so that they may be kept in proper alignment with the projected image of the top of the mercury column. As seen in FIG. 12 the thermometer 28 is translated until the reflected image of mercury 41 no longer is projected on either photocells 43 or photocells 44 through slit apertures 52 and 53 and the system is automatically stopped. In this manner the top of the mercury column may be accurately located.

A marking apparatus (see FIG. 9) is provided which is connected to the system so that it will automatically mark the point of the top of the mercury column on the thermometer. The marking apparatus includes an arm 69 (FIG. 9) responsive to a solenoid 68. The arm 69 is pivotally mounted on one end to a support as at pivot 124 with its other end free to move. An inked marking wheel 75 is mounted on the free end so that when the arm is actuated by solenoid 68, the marking wheel 75 will roll across ink pad 76, thereby picking up a coat of ink which it will then transfer to thermometer 28 as it rolls across its surface. The mark will correspond to the location of the top of the mercury column within the thermometer. A stop 69a is provided to limit the distance that the free end of arm 69 may move. Solenoid 68 will then be automatically deenergized and a tension spring 71 connected to arm 69 will return arm 69 and marking wheel 75 to their original position against stop 69b. Tension spring 77 causes ink roller 75 to press downwardly against inking pad 76 and subsequently to transfer ink onto thermometer 28 to make the desired pointing mark at the top of the mercury column of the thermometer.

In summary, the thermometer is mounted in a supporting structure which permits it to be rotated and translated. A light source is then positioned so that its rays are directed on the thermometer. A right-angle prism is positioned between the light source and the thermometer so that the rays will pass directly through the prism and illuminate the thermometer. A facing motor is connected so that it will rotate the thermometer about its longitudinal axis. The mercury column within the thermometer will reflect the rays of light back on to the prism where the rays will be deflected at a right angle through a lens which focuses and magnifies the image of the mercury column. A pair of photocells are positioned in the path of the magnified image and will, when an image of the proper intensity is received, automatically activate a power means to stop the facing motor and, consequently, the rotation of the thermometer. A high-speed translating motor is then activated thereby causing horizontal translation of the thermometer. As the image of the mercury passes the aperture of one of the photocells, the photocells automatically cause the power means to disengage the high-speed motor and engage a low-speed stepping motor. Then when the image passes the aperture of the other photocell and an image is no longer received by either photocell, the photocell activates the power means to automatically disengage the stepping motor and provide a powered stop in the translation of the thermometer. In this manner, the top of the mercury column has been accurately located and positioned for marking. Automatically the power means will activate a marking mechanism to mark the point of the top of the mercury column on the thermometer.

Figure 9:
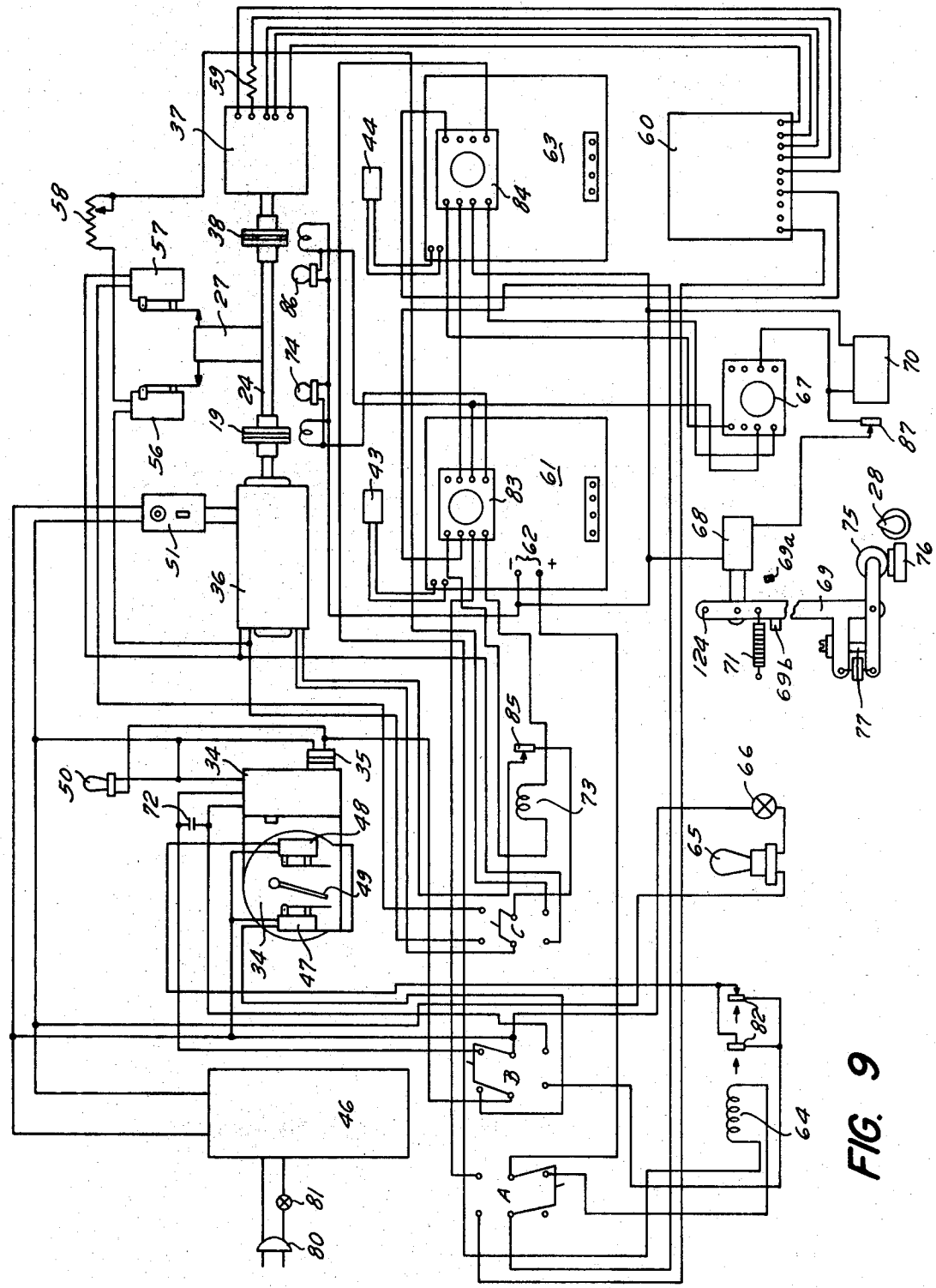
FIG. 9 is a wiring diagram of the electrical system incorporated in the thermometer-pointing apparatus.

The electrical system which connects the photoelectric portion 21a and 21b to the electromechanical portion 20 in order to operate the thermometer-pointing apparatus is illustrated in FIG. 9. By referring to FIG. 1 and FIG. 9 together, the operation of the thermometer-pointing apparatus 10 may be described as follows: In this circuit diagram, additional major mechanical and electronic elements appear. There is a line voltage controller 46. Limit switches 47 and 48 keep driven arm 49 from going too far in either the clockwise or counterclockwise direction. Signal lamp 50 glows when motor 34 is energized. Silicon-controlled rectifier 51 controls the speed of high-speed driving motor 36. When clutch 19 is energized, driving motor 36 drives precision lead screw 24 so that carriage 27 is driven horizontally to the right or the left.

When the equipment scans the mercury column to find the top of it, the major portion of the distance through which carriage 27 is driven is under the control of driving motor 36. When the end of the image of the mercury runs off of slit 52 of photoelectric cell 43, clutch 19 is deenergized and magnetic clutch 38 is energized so that stepping motor 37 does the driving until the end of the image of the mercury column runs off the slit 53 of photoelectric cell 44, whereupon stepping motor 37 instantly stops and locks in position.

The horizontal motion of carriage 27 is limited by limit switches 56 and 57. The speed of driving motor 36 is controlled by variable resistance 58 in respect to the forward speed as compared to the reverse speed. Resistance 59 may be a 4-ohm, 25-watt matching resistance specified by the manufacturer to match-stepping motor 37 with stepping motor translator 60.

Photoelectric cell 43 shown schematically connected to a common type of photoelectric amplifier 61, which includes a power supply 62 for 90 volts direct current as shown. Photoelectric cell 44 is connected to another photoelectric amplifier 63. An amplifier sold commercially as a "Photo Cell Amplifier" by the Farmer Electric Products Company in Nadick, Massachusetts, has been found to operate satisfactorily, as will many other types. Both amplifiers utilize mercury relays. The connections shown on the diagram are the same connections as those marked on the relay sockets or the chassis of these amplifier units.

On the left of the diagram, the three toggle switches, A, B and C are shown. These are used for controlling the equipment to operate in different modes for: driving a thermometer in rotation about its long axis until it produces a bright image in the photoelectric cells, whereupon it is automatically stopped and held in its position; then driving the thermometer horizontally toward the left to scan the mercury column until the top of it is found, whereupon the driving action is automatically immediately stopped; resetting the horizontal carriage drive at the right, and resetting the thermometer holder by rotating it back about its long axis prior to proceeding with the next thermometer.

Relay 64, when actuated, stops the rotation of thermometer 28 around its long axis so that the bright image which has fallen on the photoelectric cells is maintained there. Light 65 is used to actuate photoelectric cell 43 for resetting carriage 27 toward the right and is under control of switch 66. Mercury relay 67 is connected in parallel with the coil of the mercury relay 84 of amplifier 63 so that these operate simultaneously. Relay 67 supplies power to solenoid 68 to actuate arm 69 which carries an inked wheel which automatically prints the point or mark on thermometer 28 which has been stopped at the top of the mercury column. After a very brief interval, in milliseconds, the time delay relay 70 breaks the power supply circuit to solenoid 68 and spring 71 restores marking arm 69 to its original position.

Because of the physical construction of toggle switches A, B and C, when the switch handles are in one direction, the contacts in the opposite direction are closed; however, this operation description will consider the circuitry, from the point of view of this diagram, in terms of which contacts are connected for a given operation. These toggle switches are the type which have a zero center position when none of the contacts are connected to each other. This will be referred to as neutral position.

To reset the thermometer in rotation abut its long axis, switch A is set so that its center terminals are connected with its lower terminals, switch B is set so that its center terminals are connected with its upper terminals, and switch C is set in neutral position. This is the condition of the circuit shown in FIG. 9. Under these conditions, 115 volts AC, from AC line 80, when switch 81 is "one," travels through switch B to one side of motor capacitor 72 and motor 34. Current also travels through limit switch 47 to switch B and from there through clutch 35 of motor 34 and also to indicator light 50 of motor 34 and from clutch 35 and indicator light 50 to the other side of the 115-volt AC power lead coming out of the line voltage controller 46. Motor 34 continues to run until driven arm 49 actuates limit switch 47 to break the circuit. This completes the reset cycle.

To drive the thermometer in rotation about its long axis to obtain a setting producing a bright image, switch A is set so that its center and lower contacts are connected, switch B is set the same way, and switch C is set at neutral. Current flows from line voltages controller 46 to switch B and from there to one side of motor capacitor 72 and to motor 34. This drives motor 34 so that arm 49 swings in a counterclockwise direction. At some point during this swing before limit switch 48 is actuated, the bright image from the thermometer 28 is projected onto photocell 44. This actuates photoelectric amplifier 63. The action of photoelectric amplifier 63 energizes relay 64 through its contacts 82, which serves to break the circuit of facing motor 34 so that the thermometer 28 is stopped and held in a position which projects a bright image on photocell 44. These things are accomplished in the following manner. The power from line voltage controller 46 flows through limit switch 48, then to relay 64, through switch B and through clutch 35 and signal light 50 of motor 34 and finally to line voltage controller 46. Ninety volts of direct current flows from power supply 62 in amplifier 61 though switch A and through relay 64, and then to the mercury relay 84 of amplifier 63. When amplifier 63 is actuated, the same mercury relay 84 is connected to power supply 62 of amplifier 61.

The above operation description shows how to reset the thermometer carrier when a new thermometer is inserted, and how to cause the equipment to automatically rotate the thermometer about its long axis until the bright image of the mercury column is focused on photoelectric cell 44 and how the drive is stopped and held automatically.

To horizontally drive the thermometer to find and stop at the top of the mercury column, switch A is set so that the center and upper contacts are connected, switch B is set at neutral and switch C is set so that the center and lower contacts are connected.

High-speed drive motor 36 is directly connected to the line voltage controller 46 through silicon control rectifier speed control 51. Switch C is connected internally with driving motor 36.

Relay 73 is connected in parallel with the mercury relay 83 of amplifier 61 so that these relays are energized and operate simultaneously. The contacts 85 of relay 73 are normally open but are connected to close the motor circuit of driving motor 36 when a bright image of the mercury column falls on photoelectric cell 43, and to open the circuit of motor 36 when the bright image runs off photoelectric cell 43. This is accomplished through connections between the relay socket of amplifier 61 and the two sides of relay 73. One side of the normally open contacts 85 of relay 73 is connected to switch C and the other contact is connected to driving motor 36.

Switch C is used as a reversing switch to reverse the direction of driving motor 36. Driving motor 36 drives lead screw 24 only when the electromagnetic clutch 19 is actuated. Indicator light 74 is connected in parallel with the clutch coil and shows when clutch 19 is actuated.

Ninety volts positive direct current of amplifier 61 travels to switch A and then to mercury relay 83 of amplifier 61. Because a bright image is falling on photoelectric cell 43, mercury relay 83 of amplifier 61 is actuated so that an internal connection is made and current passes to the coil and indicator lamp 74 of electromagnetic clutch 19. This causes lead screw 24 to drive the thermometer carriage 27 toward the left. The motion of the thermometer 28 toward the left in turn causes the projected image of the mercury column to move across the aperture slits of cell 43 and cell 44. When the end of the image of the mercury column has been driven beyond slit 52 of photoelectric cell 43, then amplifier 61 is deactivated and its mercury relay 83 is deenergized. This causes an internal reaction in the mercury relay 83 so that positive 90 volts is then connected to the coil and indicator lamp 86 of clutch 38 thereby actuating clutch 38. This action also causes clutch 19 to be disconnected and disengaged so that driving motor 36 is no longer driving lead screw 24. Stepping motor 37 is set to run at a much lower speed than driving motor 36 and has the further characteristic designed into it that it will stop instantly with no overdrive when the circuit controlling the driving of the stepping motor is deactivated. The principal connections between the stepping motor 37 and the stepping motor translator 60 are connected continuously as specified by the manufacturer and these leads are never changed. The control of the stepping motor is obtained by opening or closing the circuit through terminals in the stepping motor translator 60. When this circuit is open the stepping motor stops, when it is closed, the stepping motor drives. This control circuit is connected and operates as follows. One terminal is connected to switch A and then to a terminal of amplifier 61. Amplifier 61 at this point is not actuated because the end of the bright image of the mercury column has been driven beyond aperture slit 52 of photoelectric cell 43. Therefore, the terminal just discussed is internally connected with mercury relay 83 in such a manner as to be connected with the mercury relay 84 of amplifier 63. As long as the bright image of mercury column is still on the aperture slit 53 of the photoelectric cell 44, amplifier 63 is actuated. Its mercury relay is internally connected and is eventually connected to the stepping motor translator 60. Therefore, the stepping motor is rotating and is driving lead screw 24 at a controlled reduced speed. As the end of the bright image of the top of the mercury column starts to pass beyond the aperture 53 of photoelectric cell 44, amplifier 63 responds by deenergizing the mercury relay 84 and the circuit to the stepping motor translator 60 is thereby broken and the stepping motor 37 comes to an immediate stop and holds lead screw 24 locked in that position. Aperture 53 of cell 44 is curved in shape so as to approximate the shape of the meniscus at the top of the mercury column thereby giving a more accurate result as to the point of the top of the mercury column.

The present invention contemplates automatic printing of the pointing mark. Thus, mercury relay 67 is connected in parallel with mercury relay 84 of amplifier 63 so that these two relays operate simultaneously and in the same way. When mercury relay 84 of amplifier 63 is deenergized, as described above, when the end of the bright image of the top of the mercury column starts to go beyond slit 53 of cell 44, relay 67 is deenergized and an internal connection is made. Ninety volts plus power passes from amplifier 61 through switch A to another terminal of amplifier 61 and finally to a terminal of relay 67. The current then passes through relay 67 and through the normally closed contacts 87 of time delay relay 70, through solenoid 68 and finally back to the return lead of the 90-volt power supply 62 of amplifier 61. The energizing of solenoid 68 causes the movement of arm 69 in a counterclockwise direction so that the ink marking wheel 75 rolls across the lens surface of the thermometer 28 printing a point or mark upon it. The plus current supplied by one of the terminals of relay 67 flows also to time delay relay 70 and back to the negative return line to power supply 62 of amplifier 61. Time delay relay 70 is adjusted so that its delay is actuated to permit the printing of the point or mark and then the time delay relay breaks the circuit of solenoid 68 whereupon tension spring 71 returns the inked wheel 75 and its supporting members to the left and its initial position.

For resetting the thermometer carriage 27 at the right, switch A is set so that the center and upper terminals are connected, switch B is set at neutral and switch C is set so that the center and upper terminals are connected. The reversing of switch C reverses the direction of the drive of driving motor 36. Also, switch 66 is closed so that current is fed from the line voltage controller 46 through switch 66, through indicator light 65 and then back to line voltage controller 46. Light 65 actuates both photoelectric cells 43 and 44 and their amplifiers 61 and 63 so that clutch 38 is deenergized and clutch 19 is actuated so that driving motor 36 drives lead screw 24 to move carriage 27 toward the right until carriage 27 actuates limit switch 57 which breaks the circuit to driving motor 36 and brings it to a stop.

Thus, an apparatus for pointing a thermometer is provided with electromechanical means for supporting a thermometer, means to rotate the thermometer about its longitudinal axis and electromechanical drive means to translate the thermometer in the direction of its longitudinal axis. In addition, a photoelectric system is provided having a light source with its rays directed at the thermometer so that the rays will be reflected by a column of fluid within the thermometer, and deflecting means is placed between the light source and the thermometer so that the rays from the light source pass directly through the deflecting means and the reflected rays will be deflected at an angle so that it may be magnified and project an image on photoelectric control means. The control means is connected with the electromechanical means so rotation of the thermometer may be stopped when the bright image is received and translation of the thermometer may be stopped when the top of the mercury column is reached and its image is no longer projected on the photoelectric control means. Marking means may be additionally provided to mark the point of the top of the fluid column of the thermometer. The operation of rotating, translating and marking the thermometer by the means described is done automatically with a significant improvement in accuracy and reduction of labor costs over any known methods.

Thus, the above mentioned objects of the invention, among others, are achieved. The range and scope of the invention are defined in the following claims.

I claim:

1. An apparatus for pointing a thermometer comprising:
a means adapted to hold said thermometer;
support means adapted to support said holding means and to cooperate therewith;
said support means adapted to permit said holding means to be rotated about the longitudinal axes of said holding means and of said thermometer;
rotational drive means adapted to cooperate with and rotate said holding means;
a photosensitive control system operating in a first mode and adapted to cooperate with and automatically stop said rotational drive means when said thermometer has been rotated to a predetermined rotational position relative to said photosensitive control system;
a longitudinal drive means adapted to cooperate with said support means and to drive it in a direction parallel to the long axes of said thermometer;
switch means for causing said photosensitive control system to operate in a second mode, and said control system being adapted to cooperate with and automatically stop said longitudinal drive means when said drive means has moved said thermometer so that the top of the mercury column therein is aligned with a predetermined location relative to the frame of said pointing apparatus; and
marking means located at said predetermined location and being adapted to cooperate with said stopped thermometer enabling actuation of said marking means to point said thermometer at the top of the mercury column therein.

2. The invention in accordance with claim 1 wherein said support means is adapted to rotatably mount said thermometer, said rotating means includes a motor positioned adjacent said support means, a clutch cooperating with said motor and adapted so that when the motor is actuated and said clutch is engaged, said motor will rotate said thermometer, said support means including a carriage having a thermometer-mounting portion adapted to mount said thermometer so that it may be rotated with respect thereto, a rotatable shaft mounted on said carriage and connected to the thermometer-mounting portion of said carriage so that when said rotatable shaft is rotated said thermometer-mounting portion and thermometer will be rotated, said thermometer being axially aligned with said rotatable shaft, said rotatable shaft including a rotatable housing having one end positioned so that said rotating means will cause said housing to rotate, a rotatable facing shaft having one end slidably mounted in said housing and the other end mounted on the thermometer-mounting portion of said carriage and positioned so that when rotated it will rotate said thermometer-mounting portion and said thermometer, said facing shaft being slidably within and cooperating with said housing so that when said rotating means rotate said housing, said facing shaft, thermometer mounting portion and thermometer will be rotated, said thermometer-mounting portion including a rotatable bar having one end housed in said rotatable shaft and its other end having a beveled edge to rest against the bulb of said thermometer and maintain the bulb in a fixed position, and holding means on said carriage to hold said thermometer on said carriage in a predetermined position so that said bulb may be contacted by said beveled edge.

3. The invention in accordance with claim 1 wherein said longitudinal drive means includes lead screw supporting means, a rotatable lead screw supported by said supporting means and adapted to drive a carriage adapted to mount a thermometer thereon so that when said lead screw is rotated, said carriage and consequently said thermometer will be translated longitudinally, means associated with said lead screw to rotate said lead screw thereby driving said carriage and said thermometer, said drive means including a reversible high speed motor, a drive clutch connecting said drive motor to one end of said lead screw so that when said drive motor is actuated and said clutch is engaged, said lead screw will be rotated and said carriage and thermometer will be longitudinally translated at relatively high speed, a low-speed motor to slow the rotation of said lead screw and eventually to stop said lead screw, a clutch connecting said motor to the other end of said lead screw so that the lead screw will be rotated when said clutch is engaged and said carriage and thermometer will be longitudinally translated, and antibacklash nut assembly mounted on said carriage and positioned so as to help maintain said carriage in tight engagement with said lead screw to prevent the backlash of said carriage, and said carriage being slidably mounted on a guide shaft which is aligned with said lead screw so that when said carriage is translated by the rotation of said lead screw said guide shaft will help support and guide said carriage in the proper direction.

4. The invention in accordance with claim 1 wherein said control system includes an optical system which directs light onto said thermometer and directs light reflected by the column of fluid within said thermometer in a predetermined direction, a photoelectric system which is responsive to said reflective light to automatically operate said rotating means, said finding means, and said marking means, said optical system including a right-angle prism having sides defining two legs and a hypotenuse with one leg facing said thermometer, said photoelectric system placed so that it faces the other leg of said prism, a light source position so that a first light ray from said light source will be directed on to said hypotenuse and will pass therethrough into said prism and simultaneously will pass through said one leg out of said prism, said first ray being directed so that when it passes out of said prism it will thereafter impinge upon said thermometer and a portion thereof will be reflected by the fluid column within said thermometer, a second ray of light constituting the reflected portion of said first ray and of a substantial large fraction of the intensity as said first ray is directed onto said one leg of said prism and will pass therethrough into said prism and simultaneously will meet and be deflected by the hypotenuse of said prism, said deflected second ray will thereafter pass through said other leg of said prism and be simultaneously directed onto said photoelectric system which is responsive thereto, and a lens placed adjacent said prism so that said deflected second ray will pass therethrough and from a projected image to be directed onto said photoelectric system.

5. The invention in accordance with claim 4 wherein said photoelectric system includes at least one photoelectric cell having an aperture in alignment with said directed reflected light, power means connected to one of said photoelectric cells to automatically stop said rotating means when an image of predetermined brightness of the fluid column is being reflected and received by said photoelectric cell, to automatically stop said finding means when the top of the fluid column is reached sand there is no reflected image being received by said photoelectric cells, and to automatically operate said marking means to point said thermometer, said photoelectric cells including a first and a second photoelectric cell and a first and second photoelectric amplifier associated respectively therewith, at least one of said photoelectric cells being responsive to an image of predetermined brightness reflected by the fluid column during rotation so as to achieve said power means to automatically stop said rotating means, after said find means is actuated, said first cell and first amplifier will activate said power means to first slow said finding means when the image of the fluid column no longer falls on the aperture of said first cell and then stop said finding means when said image no longer falls on the aperture of said second cell thereby fixing the location of the top of the fluid column, one of said amplifiers activating said power means to operate said marking means to point the top of the fluid column on said thermometer, said second cell aperture being shaped like the meniscus at the top of said column of said fluid to thereby point the exact top, and said photoelectric cells being adjustable with a micrometer which is mounted on the apparatus so that said photoelectric cells can be kept in proper alignment with the rays reflected by said fluid in said thermometer.

6. The invention in accordance with claim 1 wherein said marking means includes an automatically actuated arm pivotally fixed at one end to a base and having an inked marking wheel on the free end so that when the arm is actuated, the wheel will roll across the surface of said thermometer and print a mark thereon, means connected to said arm to return said arm to its starting position after the mark has been printed and the arm has been automatically stopped, said returning means being a tension spring fixed to said arm and to said base so that when said arm is automatically deactivated said spring will return said arm to its starting position, said means for automatically actuating said arm being a power source responsive to said finding means which will actuate said arm after the top of the fluid column has been located and properly positioned.

7. An apparatus for automatically finding and marking the top of the fluid column of a thermometer comprising:
a thermometer having a mercury column therein;
a thermometer-holding means;
thermometer-orienting means adapted to assure proper axial rotational position of said thermometer within said holding means including prevention of axial rotation of the thermometer relative to said holding means;
carriage support means adapted to support said holding means and enable said holding means to be rotated relative to said carriage;
said carriage means being capable of being driven longitudinally;
rotary drive means adapted to rotate said holding means;
a light source and an optical and photosensitive means adapted to stop said rotary drive means when the mercury column of said thermometer reflects light of an intensity above a predetermined value;
longitudinal drive means adapted to drive said carriage means longitudinally;
switch means adapted to change the operation of said light source and optical and photosensitive means so that said longitudinal drive means is stopped when the light reflected from the mercury column drops below a predetermined intensity; and
marking means located along the optical axes of said optical system and being adapted to mark said thermometer at the top of its mercury column after said reflected light has dropped below the predetermined value causing the carriage to stop its longitudinal movement.

8. The invention in accordance with claim 7 wherein said marking means includes an automatic actuated arm pivotally fixed at one end to a base and having an inked marking wheel on the free end so that when the arm is actuated the wheel will roll across the surface of said thermometer and print a mark thereon, means connected to said arm to return said arm to its starting position after the mark has been printed and the arm has been automatically deactivated, said returning means being a tension spring fixed to said arm and to said base so that when the drive means for said arm is automatically deenergized, the spring will return said arm to the starting position, and said means for automatically actuating said arm being a power source responsive to said finding means which will actuate said arm after the top of the fluid column has been located and properly positioned.

9. A method for automatically pointing a thermometer comprising:
inserting the thermometer into a holder with said thermometer being faced with its lens oriented in a predetermined rotational angle around the long axis of the thermometer relative to said holder, said holder adapted to retain said thermometer in said oriented position thereafter and the holder being rotatable to less than 360° about its long axis and being initially rotated to one extreme end of its arc of rotatability;
actuating automatic means to rotate said holder and said thermometer about their long axes while being illuminated by a light source and optical system adapted to intercept light reflected from said thermometer and focus an image of its mercury column upon a photoelectric cell adapted to control said automatic rotational means;
automatically stopping said automatic rotational means when the light reflected from the mercury column equals or exceeds a predetermined intensity falling upon the photoelectric cell, said intensity being preselected to equal that which results when the illuminating light is reflected by the mercury column and magnified by the thermometer lens when properly oriented in rotation;

actuating automatic means adapted to longitudinally drive the thermometer and holder in a direction parallel to their long axes while holding the thermometer and holder in the same rotational position previously reached;

automatically stopping said automatic longitudinal drive means when the image of the mercury column falling on the photocell abruptly diminishes in brightness below a predetermined intensity due to the top of the mercury column having been reached relative to said optical system and photocell; and actuating automatic marking means located in alignment with the top of the mercury column when the thermometer is stopped with said marking means being adapted to mark the thermometer when held in the stopped position thereby automatically pointing the thermometer at the top of the mercury column.

10. The invention in accordance with claim 9 wherein the thermometer and holder are driven longitudinally at a high speed until the image of the top of the mercury column of the thermometer passes beyond a first photocell, and then automatically driving the thermometer and holder at a reduced speed until the image of the top of the mercury column starts to pass beyond a second photocell and the drop of light intensity is made to cause immediate stopping of the longitudinal drive of the holder and thermometer.